United States Patent
Hofman et al.

(10) Patent No.: US 11,947,903 B2
(45) Date of Patent: *Apr. 2, 2024

(54) PERSPECTIVE ANNOTATION FOR NUMERICAL REPRESENTATIONS

(71) Applicant: Microsoft Technology Licensing, LLC, Redmond, WA (US)

(72) Inventors: Jake Hofman, New York, NY (US); Miroslav Dudik, New York, NY (US); Daniel Goldstein, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,925

(22) Filed: Oct. 22, 2018

(65) Prior Publication Data
US 2019/0057073 A1    Feb. 21, 2019

Related U.S. Application Data

(63) Continuation of application No. 13/801,365, filed on Mar. 13, 2013, now Pat. No. 10,146,756.

(51) Int. Cl.
*G06F 40/169*    (2020.01)
*G06F 16/30*    (2019.01)
*G06F 16/9038*    (2019.01)
*G06F 16/951*    (2019.01)
*G06F 16/955*    (2019.01)

(52) U.S. Cl.
CPC ........... *G06F 40/169* (2020.01); *G06F 16/30* (2019.01); *G06F 16/9038* (2019.01); *G06F 16/951* (2019.01); *G06F 16/9558* (2019.01)

(58) Field of Classification Search
CPC .. G06F 17/211; G06F 40/169; G06F 16/9038; G06F 16/9558; G06F 16/30; G06F 16/951
See application file for complete search history.

(56) References Cited

U.S. PATENT DOCUMENTS

| | | | |
|---|---|---|---|
| 2003/0050773 A1* | 3/2003 | Martinez | G06F 16/248 704/10 |
| 2003/0212527 A1* | 11/2003 | Moore | G06F 17/2247 702/179 |
| 2007/0006180 A1* | 1/2007 | Green | G06F 40/205 717/136 |
| 2009/0150325 A1* | 6/2009 | De | G06N 7/005 706/52 |
| 2009/0265338 A1* | 10/2009 | Kraft | G06F 16/951 |
| 2011/0010397 A1* | 1/2011 | Kathpal | G06F 17/241 707/802 |

(Continued)

*Primary Examiner* — Hope C Sheffield
(74) *Attorney, Agent, or Firm* — Calfee, Halter & Griswold LLP

(57) ABSTRACT

Various techniques for providing perspective annotation to numerical representations are disclosed herein. For example, a method includes detecting a numerical representation in an original content and retrieving one or more perspectives from a database based on the detected numerical representation. The one or more perspectives individually include a restatement of information contained in the numerical representation. The method can also include annotating the original content with the retrieved one or more perspectives to form an annotated content.

20 Claims, 5 Drawing Sheets

(56) References Cited

U.S. PATENT DOCUMENTS

| | | | | |
|---|---|---|---|---|
| 2011/0179026 A1* | 7/2011 | Mulligen | ............ | G06F 16/313 |
| | | | | 707/728 |
| 2011/0288852 A1* | 11/2011 | Dymetman | ......... | G06F 17/2827 |
| | | | | 704/4 |
| 2013/0331961 A1* | 12/2013 | Mosley | ............ | G05B 19/4185 |
| | | | | 700/73 |
| 2013/0346622 A1* | 12/2013 | Wu | ....................... | G06Q 10/10 |
| | | | | 709/227 |
| 2014/0095562 A1* | 4/2014 | Rai Bhatti | ............ | G06F 40/157 |
| | | | | 708/206 |

* cited by examiner

PERSPECTIVE ANNOTATION FOR NUMERICAL REPRESENTATIONS

CROSS-REFERENCE TO RELATED APPLICATION(S)

This application is a continuation of and claims priority to U.S. patent application Ser. No. 13/801,365, filed on Mar. 13, 2013, the disclosure of which is incorporated herein in its entirety.

BACKGROUND

Numerical representations in articles, books, or other content may be difficult to understand without context. For example, readers may not appreciate a deficit of $1.1 trillion for the United States government in 2012 because the readers may not relate to such a large number and/or deficit for a government. In contrast, readers may more readily appreciate the story if the deficit figure is expressed as, for example, $3,500 per capita or 7% of gross domestic production of the United States. However, such context may only be available with extensive research efforts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present technology is directed to detecting numerical representations in an original content and generating context or perspectives for the detected numerical representations. The numerical representations can be associated with articles, books, web pages, electronic communications, and/or other suitable original content. For example, the numerical representations may include numbers, with or without units, of monetary data, area, temperature, pressure, and/or other suitable measurements. The numerical representations may be identified by distinguishing from addresses, telephone numbers, dates, serial numbers, and/or other non-arithmetical data. Based on the detected numerical representations, context or perspectives of the numerical representations may be retrieved, suggested, and/or otherwise presented. In certain embodiments, the suggested perspectives may be ranked based on usage, popularity, importance, and/or other suitable criteria. In other embodiments, user selection of suggested perspectives may be recorded to update the ranking of the suggested perspectives.

DETAILED DESCRIPTION

Various embodiments of systems, devices, components, modules, routines, and processes for providing perspective annotation of numerical representations are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-3C.

As used herein, the term "numerical representation" generally refers to any numbers, figures, statistics, and/or other numerical quantities. For example, a numerical representation can be an amount of money, a temperature, a pressure, a flow rate, an area, a length/depth/width, a speed, a duration of time, and/or other suitable numbers with or without associated unit of measurement. Also used herein, the term "perspective" generally refers to a re-expression or restatement of information contained in a numerical representation through unit conversion, data normalization, data rescaling, data conversion, data comparison, and/or other suitable transformation techniques.

As discussed above, numerical representations may be difficult to understand without context. Several embodiments of the present technology are directed to automatically detecting numerical representations in an article, a book, a web page, or other content. Perspectives for the detected numerical representations can then be generated, for example, by retrieving from a database. The content may then be annotated or otherwise associated with the retrieved perspectives to provide context for the detected numerical representations. As a result, consumers of the content may be more interested in the content, and authors may be more aware of the significance of and/or possible errors in the numerical representations than conventional techniques.

Figure 1:
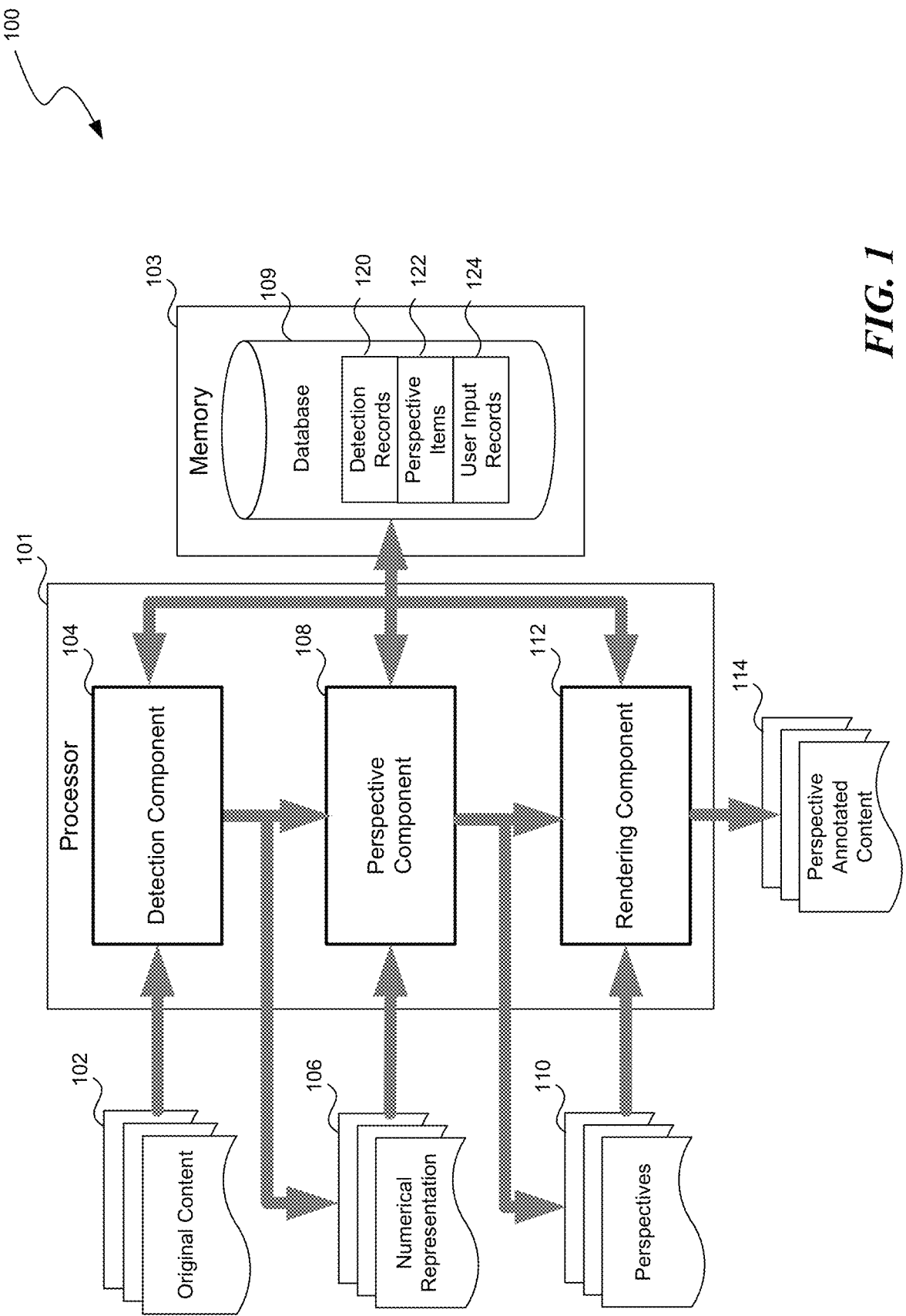
FIG. 1 is a schematic block diagram illustrating a computer system for perspective annotation in accordance with embodiments of the present technology.

FIG. 1 is a schematic block diagram illustrating hardware and software components of a computer framework 100 for perspective annotation in accordance with embodiments of the present technology. In FIG. 1 and in other Figures hereinafter, individual software components, modules, and routines may be a computer program, procedure, or process written as source code in C, C++, Java, Fortran, and/or other suitable programming languages. The computer program, procedure, or process may be compiled into object or machine code and presented for execution by one or more processors of a personal computer, a network server, a laptop computer, a smart phone, and/or other suitable computing devices. Various implementations of the source and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computer framework 100 can include a processor 101 operatively coupled to a memory 103. The processor 101 can include a mainframe processor, a microprocessor, a field-programmable gate array, and/or other suitable logic devices. The memory 103 can include volatile and/or nonvolatile computer readable storage media (e.g., magnetic disk storage media, optical storage media, and flash memory drives) excluding propagating signals. The memory 103 can be configured to store data received from, as well as instructions for, the processor 101. As shown in FIG. 1, the memory 103 can include a database 109 that contains detection records 120, perspective items 122, and user input records 124. In other embodiments, the database 109 may contain other suitable records.

The processor 101 can be configured to execute instructions for software components. For example, as shown in FIG. 1, the software components of the processor 101 can include a detection component 104, a perspective component 108, and a rendering component 112 operatively coupled to one another. In one embodiment, all of the foregoing components can reside on a single network computing device (e.g., a network server). In another embodiment, all of the foregoing components may reside on a single personal computer, laptop computer, and/or other suitable client devices. In other embodiments, at least one of the foregoing components (e.g., the perspective component 108) may reside on a network server while the remaining components reside on one or more client devices to the network server. In further embodiments, the computer framework 100 may also include interface components, input/output components, and/or other suitable components.

The detection component 104 can be configured to detect one or more numerical representations in an original content 102. The original content 102 can include an article, a book, a web page, an electronic message, and/or other suitable content. In one embodiment, the detection component 104 can include rule-based heuristics for detecting numerical representations. The rules can be implemented as comparison routines, finite state machines, and/or other suitable routines stored in the database 109 or other suitable locations as detection records 120. For example, the detection component 104 may include the following rules to distinguish non-numerical representations:

Addresses are not numerical representations;
Telephone numbers are not numerical representations; or
Dates are not numerical representations.

In another example, the detection component 104 may include the following rules to identify numerical representations:

Numerical figures following a dollar sign are numerical representations;
Numerical figures followed by a degree sign are numerical representations;
Numerical figures followed by a unit of measurement are numerical representations; or
Numerical figures with a decimal point are numerical representations.

In further examples, the detection component 104 may include other suitable rules in addition to or in lieu of the foregoing example rules.

In another embodiment, the detection component 104 can also be "trained" to identify numerical representations via machine learning. For example, sample content with previously identified numerical and/or non-numerical representations may be provided to the detection component 104. The detection component 104 may then "learn" to distinguish between the numerical and/or non-numerical representations via supervised learning, unsupervised learning, semi-supervised learning, reinforcement learning, learning to learn, and/or other suitable machine learning techniques. In other examples, the detection component 104 may be trained by monitoring user input, user feedback, and/or by using other suitable training techniques. In yet further embodiments, the detection component 104 may be implemented via natural language processing, compound term processing, deep linguistic processing, semantic indexing, and/or other suitable techniques. The detection component 104 can then transmit the detected one or more numerical representations 106 to the perspective component 108 for further processing.

The perspective component 108 can be configured to associate the detected numerical representation 106 with one or more subject of the original content 102. For example, if the original content 102 includes "The federal deficit fell to $1.1 trillion in the 2012 fiscal year." The numerical representation 106 would include "$1.1 trillion." The perspective component 108 may then analyze the original content (e.g., by examining the sentence structure) to determine that the "$1.1 trillion" is associated with "federal deficit" in 2012. In other examples, the perspective component 108 may analyze and associate the detected numerical representations 106 by examining paragraph structure, title, abstract, and/or other suitable portion of the original content 102.

The perspective component 108 can also be configured to generate one or more perspectives 110 based on the numerical representations 106 with the associated one or more subjects. In one embodiment, the perspective component 108 can search the database 109 for any perspective items 122 associated with the numerical representations 106 using the one or more subject as keywords. In other embodiments, the perspective component 108 may search the database 109 based on numerical values of the numerical representations 106 and/or other suitable criteria.

In certain embodiments, the perspective items 122 may be generated via crowdsourcing. For example, a request for input on a subject (e.g., "federal deficit") may be presented online to a large group of users for soliciting contributions. The received contributions may then be processed and stored as the perspective items 122 in the database 109. In other embodiments, the perspective items 122 may be compiled by a company, a library, or other suitable entity with or without contributions from the public in general. In further embodiments, the perspective items 122 may be machine generated by scanning, analyzing, and categorizing subjects in web pages, databases, and/or other suitable sources. In further embodiments, the perspective items 122 may be generated via at least one of the foregoing techniques and/or other suitable techniques.

In one embodiment, a perspective item 122 may include a unit conversion of the detected numerical representation 106. For example, a "federal deficit" of "$1.1 trillion" may be converted to "833 billion euros." In another embodiment, the perspective item 122 may include a rescaled figure for the detected numerical representation 106. In the foregoing example, a "federal deficit" of "$1.1 trillion" can also be expressed as $3,500 per capita. In another embodiment, the perspective item 122 may also include a comparison with other associated figures. For example, a "federal deficit" of "$1.1 trillion" represents a 20% decrease from 2011 or 7% of gross domestic product of the United States. In yet another embodiment, the perspective item 122 may also include the rank, quantile, or percentile of the detected numerical representation relative to an appropriate reference class. For example, a "federal deficit" of "$1.1 trillion" is the largest national deficit among the developed countries. In further embodiments, the perspective items 122 may also be expressed or stated in other suitable manners.

The perspective component 108 can optionally be configured to rank the retrieved perspective items 122 based on usage, popularity, importance, and/or other suitable criteria. For example, if the expression of the "federal deficit" of "$1.1 trillion" as $3,500 per capita is the most frequently restatement by users, the perspective component 108 may rank the expression higher than other expressions. In other examples, a combination of the foregoing and/or other suitable criteria may be used to rank the perspective items 122. The perspective component 108 then supplies the perspective items 122 ranked or un-ranked to the rendering component 112 as perspectives 110.

The rendering component 112 can be configured to annotate or otherwise associate the original content 102 with the perspectives 110 to generate perspective annotated content 114. The original content 102 may be annotated as comments, footnotes, and/or other suitable items in the original content 102. In certain embodiments, the rendering component 112 can also be configured to display the perspective annotated content 114 as a web page, an electronic book, and/or other suitable types of content on a computer monitor, a touch screen, and/or other suitable computer output devices.

In further embodiments, the rendering component 112 can also be configured to receive user input to the perspective annotated content 114. The received user input may then be stored in the database 109 as user input records 124 for ranking, generating, and/or otherwise processing the perspective items 122. In response to the received user input, in one embodiment, the rendering component 112 may rearrange (e.g., reorder) the perspectives 110 as annotations in the perspective annotated content 114. In another embodiment, the rendering component 112 can also be configured to facilitate inserting a user selected perspective 110 into the original content 102. In further embodiments, the render component 112 may update the displayed perspective annotated content 114 with the inserted perspective 110. Operations of the computer framework 100 are described in more detail below with reference to FIG. 2. Example renderings of a perspective annotated content 114 are described in more detail below with reference to FIGS. 3A-3C.

Figure 2:
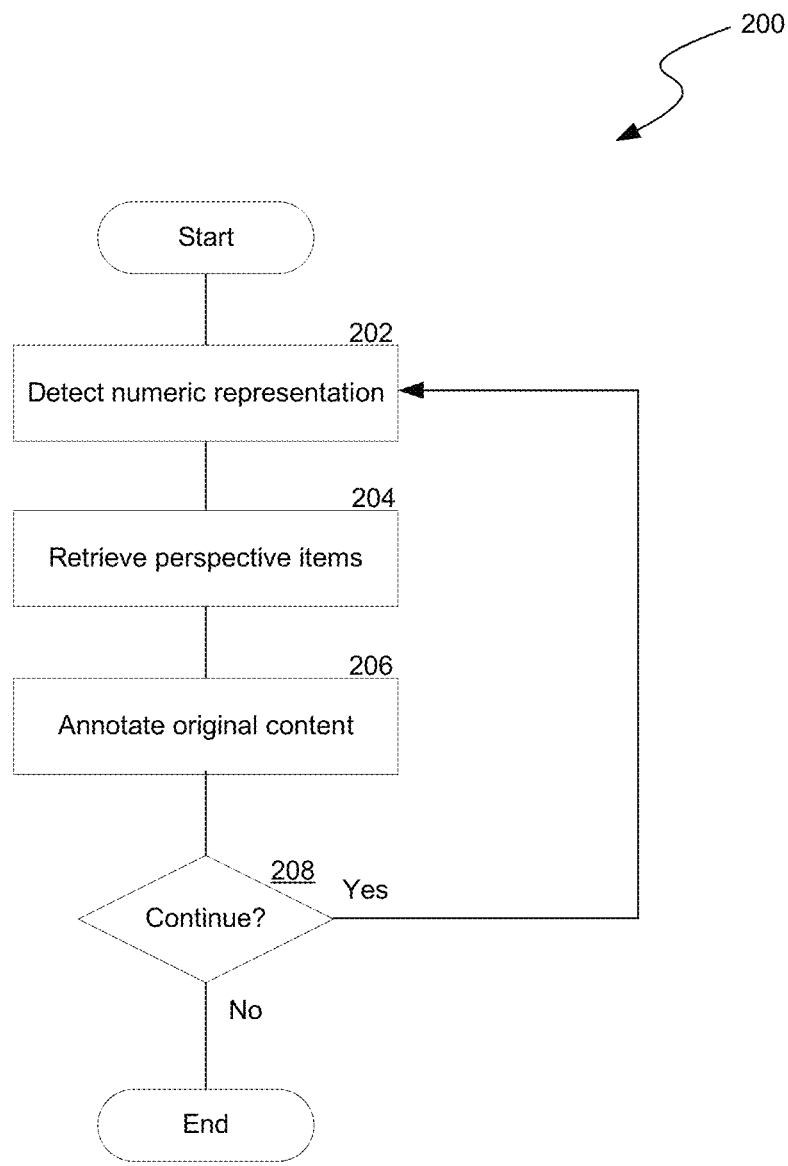
FIG. 2 is a flow diagram illustrating a process for perspective annotation in accordance with embodiments of the present technology.

FIG. 2 is a flow diagram illustrating a process 200 for perspective annotation in accordance with embodiments of the present technology. Embodiments of the process 200 may be performed by the computer framework 100 of FIG. 1 and/or other suitable computing devices. Embodiments of the process 200 may also be embodied on an article of manufacture, e.g., as processor-readable instructions stored on a computer readable storage medium or be performed as a computer-implemented process, or in other suitable ways. Even though the process 200 is described below with reference to the computer framework 100 of FIG. 1, in other embodiments, the process 200 may be implemented in a standalone computer or other suitable computer systems or devices.

As shown in FIG. 2, the process 200 includes detecting numeric representations of an original content at stage 202. In certain embodiments, the content can include a web page, email, and/or other suitable types of electronic content published by a content source. In one embodiment, detecting numeric representations can include transmitting the electronic content to a server having the computer framework 100 of FIG. 1, and detecting numerical representations using the detection component 104, as described with reference to FIG. 1. The server may be associated with or independent from the content source. In another embodiment, the computer framework 100 may reside on a client device. Upon receiving the electronic content from a client application of the client device, numerical representations may be detected using the detection component 104, as described with reference to FIG. 1. In yet another embodiment, a user of the electronic content may submit the electronic content to a server having the computer framework 100 of FIG. 1. Upon receiving the submission, the server may then detect the numerical representations using the detection component 104, as described with reference to FIG. 1.

The process 200 can then include retrieving perspective items based on the detected numerical representations and transmitting the retrieved perspective items in, for example, a machine readable format or other suitable formats, to the client device or client application at stage 204. For example, in one embodiment, the perspective items may be retrieved from the database 109 (FIG. 1) based on keywords associated with the detected numerical representations, as described in more detail above with reference to FIG. 1. In other embodiments, the perspective items may also be retrieved from other suitable sources. For example, the perspective items may be generated by crowdsourcing, machine learning, user input, and/or other suitable information gathering techniques.

The process 200 can then include annotating the original content at stage 206. The original content may be annotated with the retrieved perspective items as comments, footnotes, and/or other suitable content components. In one embodiment, the annotated content may be output to a user as a web page and/or other suitable read-only document. In another embodiment, annotating the original content can include embedding interactive components in the annotations. For example, the annotated content may be configured to receive user selections of the annotated perspective items, and insert the selected perspective items into the body of the original content in a word processing application, a web publishing application, and/or other suitable applications. In further examples, the annotated content may include polls and/or other suitable interactive components.

The process 200 then includes a decision stage 208 to determine if the process continues. In one embodiment, the process continues if additional content is present. In other embodiments, the process can continue based on other suitable criteria. If the process continues, the process 200 reverts to detecting numeric representation at stage 202; otherwise, the process ends.

Figure 3A:
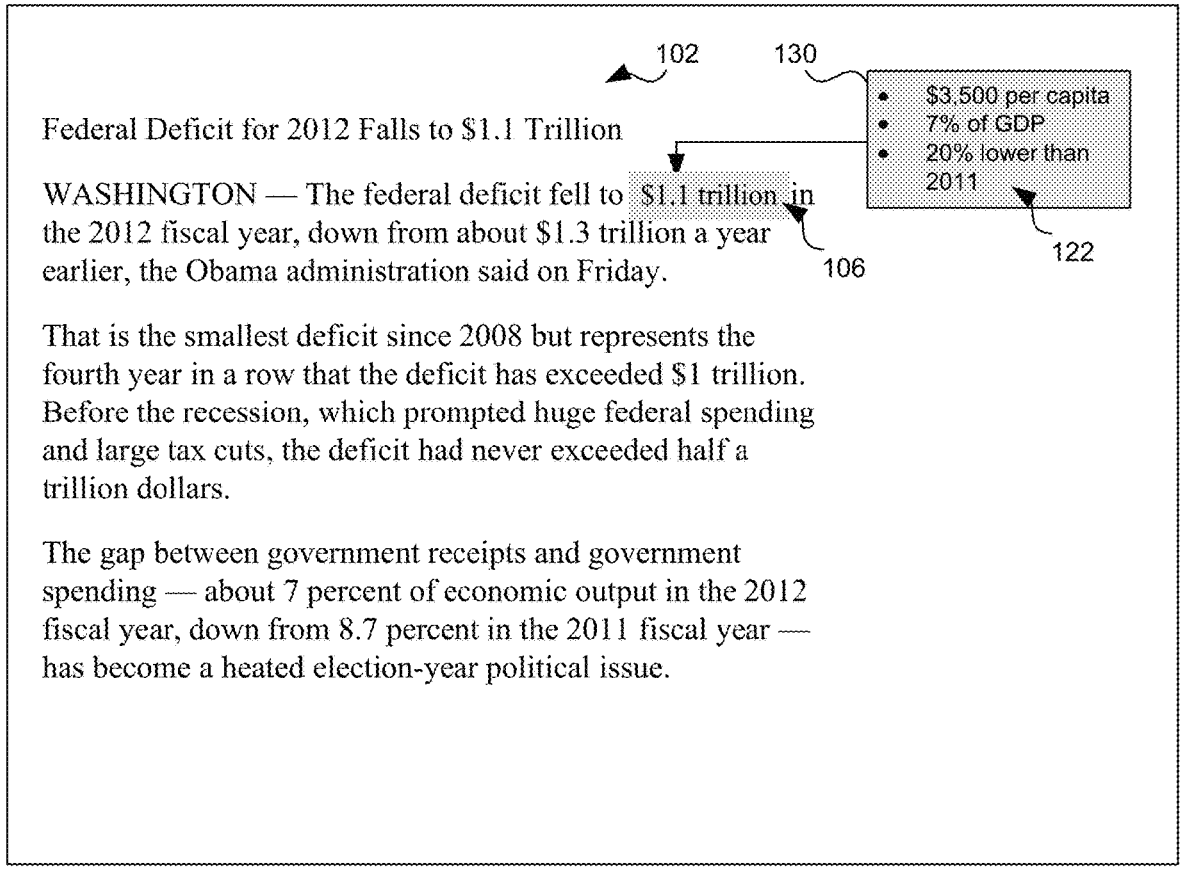
FIGS. 3A-3C are example renderings of annotated content with perspective annotation in accordance with embodiments of the present technology.
Figure 3B:
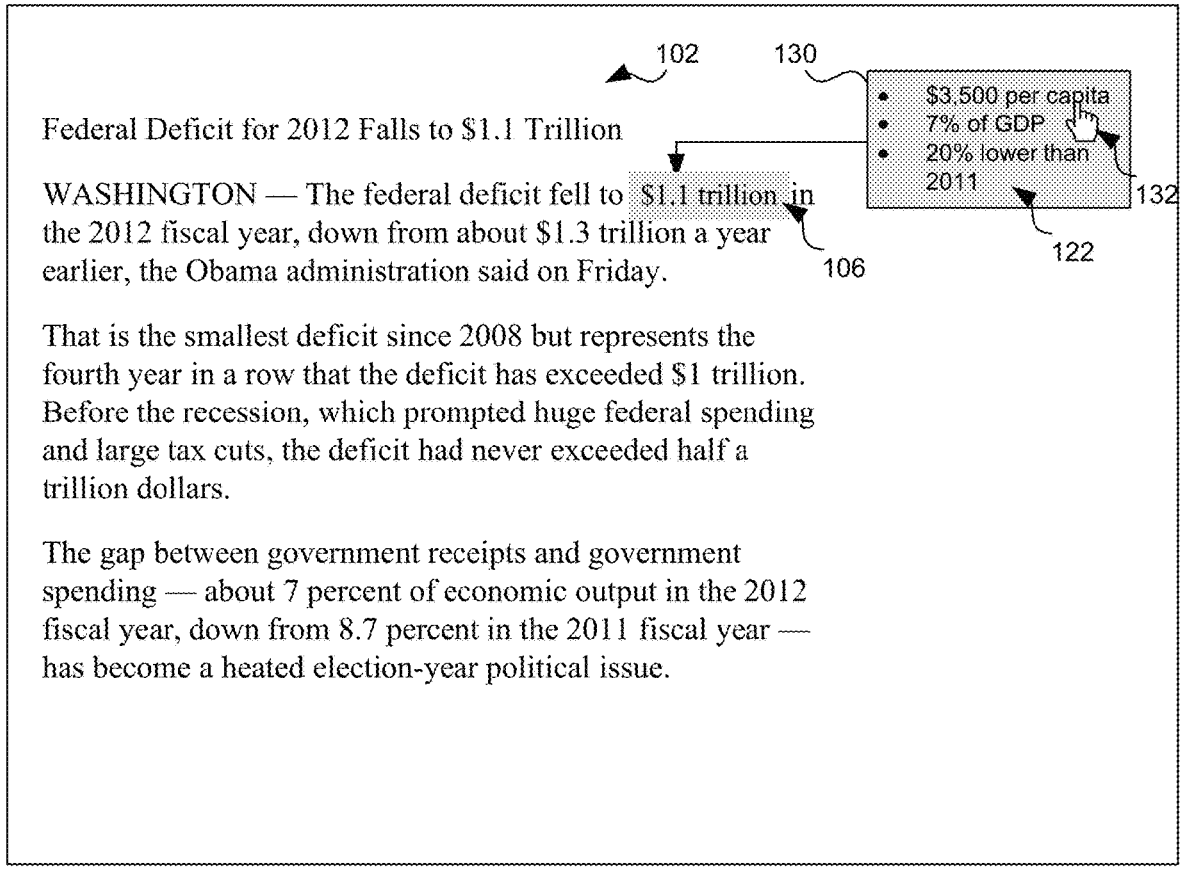
Figure 3C:
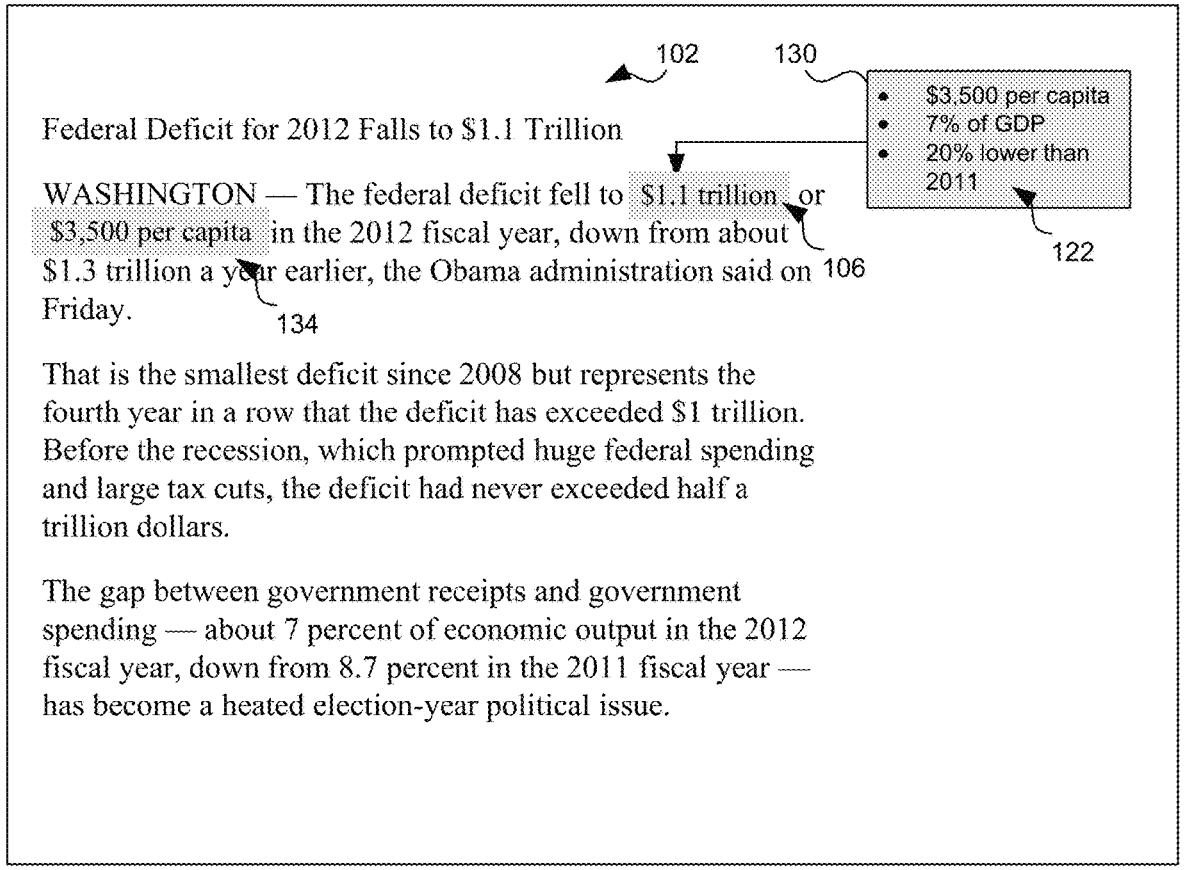

FIGS. 3A-3C are example rendering of annotated content with perspective annotation in accordance with embodiments of the present technology. As shown in FIG. 3A, the original content 102 includes a news story entitled "Federal Deficit for 2012 Falls to $1.1 Trillion." By processing the original content 102 in accordance with embodiments of the present technology, the numerical representation 106 (i.e., "1.1 Trillion") may be identified, and a plurality of perspective items 122 (i.e., $3,500 per capita, 7% of GDP, 20% lower than 2011") may be displayed in a window 130 as a comment adjacent the original content 102. As shown in FIG. 3B, the displayed perspective items 122 may also allow a user to select one of the perspective items 122 (i.e., "$3,500 per capita") with a single click, double click, or other suitable input mechanisms (as shown with cursor 132). In response, as shown in FIG. 3C, the selected perspective item 122 (i.e., "$3,500 per capita") may be inserted into the body of the original content 102 as new text 134.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method performed by a processor coupled to a memory containing a database, the method comprising:

receiving an original content from a client device or a client application via a computer network;

detecting a subject phrase and an associated numerical representation in the received original content, the numerical representation including a number and a unit of measure, wherein the numerical representation denotes a value associated with the subject phrase;

retrieving one or more perspectives from the database by querying the database using the detected subject phrase as one or more keywords, the one or more perspectives individually including a different restatement of information contained in the numerical representation describing the same detected subject phrase than other perspectives, wherein the restatement includes another numerical representation having another number with another unit of measurement describing the detected subject phrase, the another number and the another unit of measurement being different than the number and the unit of measurement in the detected numerical representation, wherein retrieving the one or more perspectives includes retrieving a plurality of perspectives each including a different re-expression of information contained in the detected numerical representation describing the subject than other retrieved perspectives;

displaying the retrieved plurality of perspectives to a user;

receiving user input to select one of the retrieved perspectives displayed to the user in the annotated content;

upon receiving the user input, inserting the selected one of the perspectives into the original content; and transmitting, via the computer network, the selected one or more perspectives having the another number and the another unit of measurement in a machine readable format to the client device or the client application for displaying on the client device to annotate the original content having the subject with the number and the unit of measurement.

2. The method of claim 1 wherein detecting the numerical representation includes detecting the numerical representation based on rule-based heuristics.

3. The method of claim 1 wherein detecting the numerical representation includes detecting the numerical representation based on rule-based heuristics to distinguish at least one of an amount of money, a temperature, a pressure, a flow rate, an area, a length, a depth, a width, a speed, or a duration of time from at least one of an address, a telephone number, a date, or a serial number.

4. The method of claim 1 wherein detecting the numerical representation includes detecting the numerical representation based on at least one or the following rules:
an address is not a numerical representation;
a telephone number is not a numerical representation;
a date value is not a numerical representation; or
a serial number is not a numerical representation.

5. The method of claim 1 wherein detecting the numerical representation includes detecting the numerical representation based on at least one or the following rules:
a numerical figure following a dollar sign is a numerical representation;
a numerical figure followed by a degree sign is a numerical representation;
a numerical figure followed by a unit of measurement is a numerical representation; or
a numerical figure with a decimal point is a numerical representation.

6. The method of claim 1 wherein the processor includes a detection component, and wherein the method further comprises training the detection component to distinguish between a numerical representation and a non-numerical representation via machine learning.

7. A computer system having a processor, a memory, and a display interconnected to one another, the memory containing instructions, when executed by the processor, causing the processor to perform a process comprising:
identifying a subject phrase and an associated numerical representation in an article having original content, the numerical representation including a number and a unit of measure, wherein the numerical representation denotes a value of the number and the unit of measure associated with the identified subject phrase;
generating a plurality of perspectives, where the plurality of perspectives include a perspective for the identified subject phrase with the associated numerical representations from a database by querying the database using the identified subject phrase as one or more keywords, the perspective including a re-expression or restatement of information contained in the numerical representation describing the subject phrase, wherein the re-expression of information includes another numerical representation having another number with another unit of measurement describing the same identified subject phrase, the another number and the another unit of measurement being different than the number and the unit of measurement in the detected numerical representation in the article;
receiving user input to select the perspective;
inserting the selected perspective into the original content; and
outputting the article with both the identified subject phrase and the associated numerical representation and the selected perspective having the another number and the another unit of measurement on the display, wherein outputting the article comprises:
outputting the original content and the generated plurality of perspectives on the display; and
inserting the selected perspective into the original content and displaying both the inserted perspective and numerical representation in the original content.

8. The computer system of claim 7, where the numerical representation is one of an amount of money, a temperature, a pressure, a flow rate, an area, a length, a depth, a width, a speed, or a duration of time.

9. The computer system of claim 7, where at least one rule is employed to identify the numerical representation in the article.

10. The computer system of claim 7, where a trained computer model is employed to identify the numerical representation in the article.

11. The computer system of claim 7, where the selected perspective includes a unit conversion of the numerical representation.

12. The computer system of claim 7, where the selected perspective includes a rescaled value of the numerical representation.

13. The computer system of claim 7, where the selected perspective includes a comparison between the numerical representation and another figure.

14. The computer system of claim 7, the process further comprising:
ranking the plurality of perspectives based upon an attribute associated with the plurality of perspectives, where the plurality of perspectives are caused to be displayed in accordance with the ranking.

15. The computer system of claim 14, where the attribute is one of usage or popularity.

16. The computer system of claim 7, where the plurality of perspectives are included in the original content as one of comments or footnotes.

17. A non-transitory computer-readable medium comprising instructions that, when executed by a processor, cause the processor to perform acts comprising:
receiving an original content from a client device or a client application via a computer network;
detecting a subject phrase and an associated numerical representation in the received original content, the numerical representation including a number and a unit of measure, wherein the numerical representation denotes a value associated with the subject phrase;
retrieving one or more perspectives from the database by querying the database using the detected subject phrase as one or more keywords, the one or more perspectives individually including a different restatement of information contained in the numerical representation describing the same detected subject phrase than other perspectives, wherein the restatement includes another numerical representation having another number with another unit of measurement describing the detected subject phrase, the another number and the another unit of measurement being different than the number and the unit of measurement in the detected numerical representation, wherein retrieving the one or more perspectives includes retrieving a plurality of perspectives each including a different re-expression of information contained in the detected numerical representation describing the subject than other retrieved perspectives;
displaying the retrieved plurality of perspectives to a user;
receiving user input to select one of the retrieved perspectives displayed to the user in the annotated content;
upon receiving the user input, inserting the selected one of the perspectives into the original content; and
transmitting, via the computer network, the selected one or more perspectives having the another number and the another unit of measurement in a machine readable format to the client device or the client application for displaying on the client device to annotate the original content having the subject with the number and the unit of measurement.

18. The non-transitory computer-readable medium of claim 17, wherein detecting the numerical representation includes detecting the numerical representation based on rule-based heuristics.

19. The non-transitory computer-readable medium of claim 17, wherein detecting the numerical representation includes detecting the numerical representation based on rule-based heuristics to distinguish at least one of an amount of money, a temperature, a pressure, a flow rate, an area, a length, a depth, a width, a speed, or a duration of time from at least one of an address, a telephone number, a date, or a serial number.

20. The non-transitory computer-readable medium of claim 17, wherein detecting the numerical representation includes detecting the numerical representation based on at least one or the following rules:
an address is not a numerical representation;
a telephone number is not a numerical representation;
a date value is not a numerical representation; or
a serial number is not a numerical representation.

* * * * *